United States Patent
Adachi et al.

(10) Patent No.: US 8,039,146 B2
(45) Date of Patent: Oct. 18, 2011

(54) ELECTROCHEMICAL DEVICE COMPRISING ALKALINE ELECTROYLTE

(75) Inventors: Mitsuji Adachi, Osaka (JP); Masatoshi Hano, Osaka (JP)

(73) Assignee: Panasonic Corporation, Osaka (JP)

( * ) Notice: Subject to any disclaimer, the term of this patent is extended or adjusted under 35 U.S.C. 154(b) by 1025 days.

(21) Appl. No.: 11/878,500

(22) Filed: Jul. 25, 2007

(65) Prior Publication Data
US 2008/0026287 A1 Jan. 31, 2008

Related U.S. Application Data

(60) Provisional application No. 60/833,276, filed on Jul. 26, 2006.

(51) Int. Cl.
*H01M 2/00* (2006.01)
*H01M 10/26* (2006.01)

(52) U.S. Cl. ........ 429/163; 429/168; 429/223; 429/224; 429/229; 429/206

(58) Field of Classification Search ............... 429/163, 429/167, 168, 164, 223, 224, 229, 231, 206
See application file for complete search history.

(56) References Cited

U.S. PATENT DOCUMENTS

| | | | |
|---|---|---|---|
| 4,865,927 A | 9/1989 | Laig-Horstebrock et al. | |
| 5,424,145 A | 6/1995 | Tomantschger et al. | |
| 5,679,181 A | 10/1997 | Ohmura et al. | |
| 6,692,869 B1 | 2/2004 | Ohmura et al. | |
| 2004/0076876 A1 | 4/2004 | Ishizuka et al. | |
| 2005/0003272 A1* | 1/2005 | Jiang et al. | 429/229 |
| 2008/0305392 A1* | 12/2008 | Ohmura et al. | 429/176 |

FOREIGN PATENT DOCUMENTS

| | | |
|---|---|---|
| CN | 1031299 | 2/1989 |
| CN | 1082988 A | 3/1994 |
| CN | 1112737 A | 11/1995 |
| CN | 1311829 A | 9/2001 |
| CN | 1484714 A | 3/2004 |
| JP | 09-035720 | 2/1997 |
| JP | 09-115513 | 5/1997 |
| JP | 2004-139909 | 5/2004 |

OTHER PUBLICATIONS

Chinese Office Action, with English translation, issued in Chinese Patent Application No. CN 2007101369827, mailed Jan. 16, 2009.
Chinese Office Action w/ English translation thereof, issued in Chinese Patent Application No. CN 200710136982.7 dated Oct. 9, 2009.

* cited by examiner

*Primary Examiner* — Raymond Alejandro
(74) *Attorney, Agent, or Firm* — McDermott Will & Emery LLP

(57) ABSTRACT

An electrochemical device, such as an alkaline battery, that is excellent in leakage-resistance and storage characteristics is provided by controlling at least one of the following two conditions with respect to at least the inner side surface of a battery case comprising a nickel plated steel plate. The two conditions are: (1) the intensity ratio of Fe to Ni ($I_{Fe/Ni}$) as determined by electron probe microanalysis; and (2) the ratio of the area with an intensity ratio of Fe to Ni ($I_{Fe/Ni}$) of greater than 1.0 as determined by electron probe microanalysis to the whole area.

22 Claims, 4 Drawing Sheets

F I G. 4
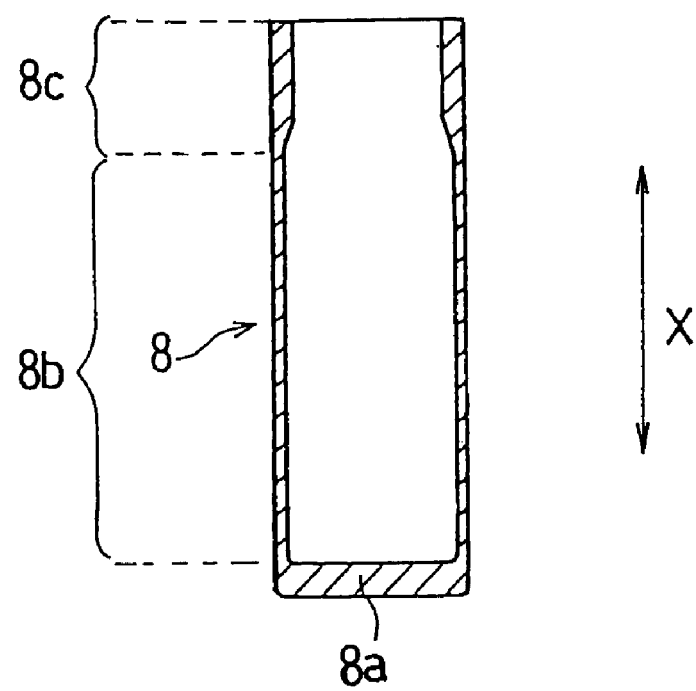

ELECTROCHEMICAL DEVICE COMPRISING ALKALINE ELECTROYLTE

CLAIM OF PRIORITY

This application claims the benefit of U.S. Provisional Application No. 60/833,276, filed on Jul. 26, 2006, the disclosure of which is incorporated herein by reference.

FIELD OF THE INVENTION

The present invention relates to electrochemical devices, such as alkaline batteries, that contain nickel oxyhydroxide, manganese dioxide, or mixtures of nickel oxyhydroxide and manganese dioxide as positive electrode active materials.

BACKGROUND OF THE INVENTION

Alkaline batteries, which are a kind of electrochemical device, include a battery case, a positive electrode mixture (positive electrode), a gelled negative electrode containing zinc or a zinc alloy, a separator that separates the positive electrode from the gelled negative electrode, and an alkaline electrolyte.

Recently, the load of devices powered by alkaline batteries has been increasing. Accordingly, there is a demand for alkaline batteries with excellent discharge characteristics. A method that has been employed to improve discharge characteristics of a battery is to mix nickel oxyhydroxide into the positive electrode mixture in order to heighten the potential of the positive electrode.

The battery case of such an alkaline battery is usually made of a steel plate having a nickel plating layer. The inner surface of the battery case almost inevitably has areas where Fe is slightly exposed. Suppressing the formation of such Fe exposed areas is difficult particularly when the thickness of the nickel plating layer is reduced to cut costs.

An alkaline battery is fabricated by placing the positive electrode, the separator, the negative electrode, the alkaline electrolyte, etc. into the battery case and sealing the opening of the battery case. If the inner surface of the battery case has Fe exposed areas, the Fe gradually dissolves therefrom after the battery fabrication, thereby forming an oxide coating, which may partially cover the inner surface of the battery case. As a result, the conductivity inside the battery lowers and the internal resistance increases, so that the discharge characteristics degrade when the battery is stored for a period of time after the battery fabrication (i.e., degradation of storage characteristics, particularly high-rate discharge characteristics).

Also, the Fe ions dissolved from the Fe exposed areas may move in the battery and be deposited on the zinc surface of the negative electrode to form a local cell. As a result, hydrogen gas is produced on the zinc surface, and the produced hydrogen gas reduces the manganese dioxide and nickel oxyhydroxide (positive electrode active materials) thereby decreasing the battery capacity and causing the discharge characteristics to degrade when the battery is stored for a period of time after the battery fabrication (i.e., degradation of storage characteristics, particularly high-rate and low-rate discharge characteristics). Further, if the produced gas builds up, the pressure inside the battery (inner pressure) rises thereby actuating the explosion-proof valve to release the gas for preventing rupture which may result in leakage (degradation of leakage-resistance characteristics).

BRIEF SUMMARY OF THE INVENTION

However, the use of conventional nickel plated steel plates has not sufficiently suppressed the formation of an oxide coating and a local cell resulting from Fe exposed areas nor has it improved leakage-resistance and storage characteristics. Therefore, an aspect of the invention is an electrochemical device, such as an alkaline battery, that is excellent in leakage-resistance and storage characteristics.

The inventors have conducted diligent research into nickel steel plates used to form battery cases. As a result, they have found that by controlling the nickel plating layer of a nickel plated steel plate on the surface that becomes the inner surface of a battery case, it is possible to realize an electrochemical device having excellent leakage-resistance and storage characteristics that have not yet been achieved.

More specifically, the inventors have found that an electrochemical device having excellent leakage-resistance and storage characteristics can be obtained by controlling at least one of the following two conditions with respect to at least the inner side surface of a battery case that is formed from a nickel plated steel plate. The two conditions are: (1) the intensity ratio of Fe to Ni; and (2) the ratio of the area with an intensity ratio of Fe to Ni of greater than 1.0 to the whole area. The intensity ratio may be determined by electron probe microanalysis.

As used herein, "electron probe microanalysis" refers to an analytical method in which a substance sample is irradiated with an accelerated electron beam (i.e., excited by the electron beam) to detect and identify elements that constitute the micro-area irradiated with the electron beam and to determine the ratios (concentrations) of the respective constituent elements, based on the spectrum of characteristic X-rays emitted therefrom. In an aspect of the invention, at least the inner side surface of the battery case with a nickel plating layer is irradiated with an accelerated electron beam. Electron probe microanalysis is hereinafter referred to as EPMA.

As used herein, "the intensity ratio of Fe to Ni as determined by electron probe microanalysis" refers to the ratio ($I_{Fe/Ni}$) of the intensity attributed to Fe ($I_{Fe}$) to the intensity attributed to Ni ($I_{Ni}$) according to EPMA. This ratio is hereinafter referred to as the "intensity ratio $I_{Fe/Ni}$".

Also, "the ratio of the area with an intensity ratio of Fe to Ni of greater than 1.0 as determined by electron probe microanalysis to the whole area" is hereinafter referred to as the "existence rate" or the "existence rate of the area with an intensity ratio $I_{Fe/Ni}$ of greater than 1.0."

Particularly, in an aspect of the invention, EPMA is performed, for example, as follows. First, a sample of approximately 1 cm×approximately 1 cm is cut out of a nickel plated steel plate that constitutes a battery case. The sample is then set in an electron probe microanalyzer and measured under the following conditions.

Acceleration voltage: 15 kV
Amount of electron beam (probe current): 0.05 μA
Measurement time per point: 30 ms
Measurement range per point (1 pixel): 2 μm
Irradiation range per point (probe diameter): 1 μm or less To detect iron element, a Lα ray (wavelength 17.9 Å), which is one of characteristic X-rays of iron element, is counted and the count is used as the intensity of iron $I_{Fe}$. Also, to detect nickel element, a Kα-ray (1.66 Å) of nickel is counted and the count is used as the intensity of nickel $I_{Ni}$.

In order to obtain the intensity ratio $I_{Fe/Ni}$ (condition (1)) and the existence rate (condition (2)), the measurement data obtained from the above-mentioned measurement conditions is processed, for example, as follows. Specifically, the characteristic X-ray of Fe and the characteristic X-ray of Ni are measured at a given point (an area of 2 μm×2 μm), and based on the counts of the characteristic X-rays, the intensity ratio $I_{Fe/Ni}$ at the point is calculated. In measuring one sample, such measurement is conducted, for example, in an area of 510 μm×680 μm, at 86700 points (255 points×340 points=86700 points). The average value of the intensity ratios $I_{Fe/Ni}$ at all the points is calculated, and this average value is used as the intensity ratio $I_{Fe/Ni}$ in an aspect of the invention.

Also, the intensity ratios $I_{Fe/Ni}$ thus obtained are statistically analyzed to obtain frequency distribution, and the ratio of the points with an intensity ratio $I_{Fe/Ni}$ of greater than 1.0 to all the points was obtained. This ratio was used as the existence rate of the present invention. It should be noted that the surface of a case made from an iron plate has cracks of tens of micrometers (μm). Therefore, it is desirable that the measurement range per point be 5 μm or less, and that the total measurement area be 500 μm×500 μm or more.

An aspect of the invention provides an electrochemical device including: a positive electrode comprising a positive electrode active material selected from the group consisting of nickel oxyhydroxide, manganese dioxide, and mixtures of nickel oxyhydroxide and manganese dioxide; a negative electrode comprising a zinc component as a negative electrode active material; a separator interposed between the positive electrode and the negative electrode; an alkaline electrolyte; and a battery case for housing the positive electrode, the negative electrode, the separator, and the alkaline electrolyte. The battery case comprises a nickel plated steel plate having a nickel plating layer at least on the inner surface thereof. At least the inner side surface of the battery case is such that the intensity ratio $I_{Fe/Ni}$ as determined by EPMA is from 0 to approximately 0.1, that is, $0<I_{Fe/Ni}\leq 0.1$.

According to this configuration, in at least a part of the inner surface of the battery case, exposure of Fe can be minimized, so that formation of oxide coating due to dissolution of Fe from Fe exposed areas, an increase in internal resistance caused by such oxide coating, and formation of a local cell can be minimized. It is therefore possible to realize an electrochemical device having excellent leakage-resistance and storage characteristics relative to conventional ones.

Another aspect of the invention provides an electrochemical device including: a positive electrode comprising a positive electrode active material selected from the group consisting of nickel oxyhydroxide, manganese dioxide, and mixtures of nickel oxyhydroxide and manganese dioxide; a negative electrode comprising a zinc component as a negative electrode active material; a separator interposed between the positive electrode and the negative electrode; an alkaline electrolyte; and a battery case for housing the positive electrode, the negative electrode, the separator, and the alkaline electrolyte. The battery case comprises a nickel plated steel plate having a nickel plating layer at least on the inner surface thereof. At least the inner side surface of the battery case is such that the ratio of the area with an intensity ratio $I_{Fe/Ni}$ of greater than 1.0 as determined by EPMA to the whole area (i.e., existence rate) is 0 to approximately 1.0%, that is, $0<$(existence rate)$\leq 1.0\%$.

According to this configuration, in at least a part of the inner surface of the battery case, partial exposure of Fe can be minimized, so that formation of oxide coating due to dissolution of Fe from Fe exposed areas, an increase in internal resistance caused by such oxide coating, and formation of a local cell can be minimized. It is therefore possible to realize an electrochemical device having excellent leakage-resistance and storage characteristics relative to conventional ones.

Another aspect of the invention provides an electrochemical device including: a positive electrode comprising a positive electrode active material selected from the group consisting of nickel oxyhydroxide, manganese dioxide, and mixtures of nickel oxyhydroxide and manganese dioxide; a negative electrode comprising a zinc component as a negative electrode active material; a separator interposed between the positive electrode and the negative electrode; an alkaline electrolyte; and a battery case for housing the positive electrode, the negative electrode, the separator, and the alkaline electrolyte. The battery case comprises a nickel plated steel plate having a nickel plating layer at least on the inner surface thereof. At least the inner side surface of the battery case is such that the intensity ratio $I_{Fe/Ni}$ as determined by EPMA is from 0 to approximately 0.1, that is, $0<I_{Fe/Ni}\leq 0.1$, and that the ratio of the area with an intensity ratio $I_{Fe/Ni}$ of greater than 1.0 as determined by EPMA to the whole area (i.e., existence rate) is 0 to approximately 1.0%, that is, $0<$(existence rate)$\leq 1.0\%$.

According to this configuration, in at least a part of the inner surface of the battery case, exposure of Fe can be minimized in a more reliable manner, so that formation of oxide coating due to dissolution of Fe from Fe exposed areas, an increase in internal resistance caused by such oxide coating, and formation of a local cell can be minimized. It is therefore possible to realize an electrochemical device having excellent leakage-resistance and storage characteristics relative to conventional ones.

While the novel features of the invention are set forth particularly in the appended claims, the invention, both as to organization and content, will be better understood and appreciated, along with other aspects and features thereof, from the following detailed description taken in conjunction with the drawings.

BRIEF DESCRIPTION OF THE SEVERAL VIEWS OF THE DRAWING

FIG. 4 is a schematic cross-sectional view of the battery case produced by drawing and ironing.

DETAILED DESCRIPTION OF THE INVENTION

Figure 1:
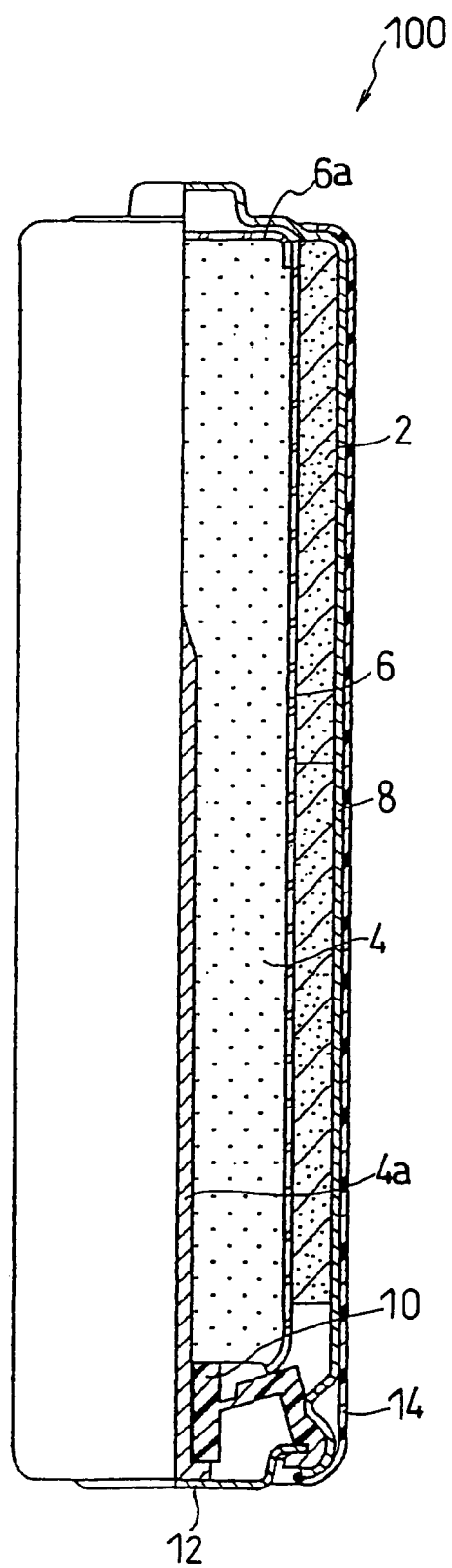
FIG. 1 is a partially sectional front view of an alkaline primary battery in accordance with an aspect of the invention.

Referring now to drawings, embodiments of the invention are described in detail. However, the invention is not limited to only these embodiments. First, referring to FIG. 1, main components of an alkaline battery in one aspect of the invention are described. FIG. 1 is a partially sectional front view of an alkaline primary battery.

As shown in FIG. 1, an alkaline primary battery 100 of the present invention includes: a positive electrode 2 comprising a positive electrode that contains nickel oxyhydroxide, manganese dioxide, or mixtures of nickel oxyhydroxide and manganese dioxide as the positive electrode active material; a gelled negative electrode 4 containing a zinc component as a negative electrode active material; a separator 6 interposed between the positive electrode 2 and the negative electrode 4; an alkaline electrolyte (not shown); and a battery case 8 containing the positive electrode 2, the negative electrode 4, the separator 6, and the alkaline electrolyte.

First, the battery case 8 is described. The battery case 8 is formed from a nickel plated steel plate with a nickel plating layer. The nickel plating layer is positioned at least on the inner surface of the battery case 8. The battery case 8 is produced by a conventional method such as drawing and ironing (hereinafter referred to as the D&I process) or drawing, in order to enhance the productivity and reduce the production cost of the battery can. Taking the D&I process as an example, a method for producing the battery case 8 is described.

Figure 2:
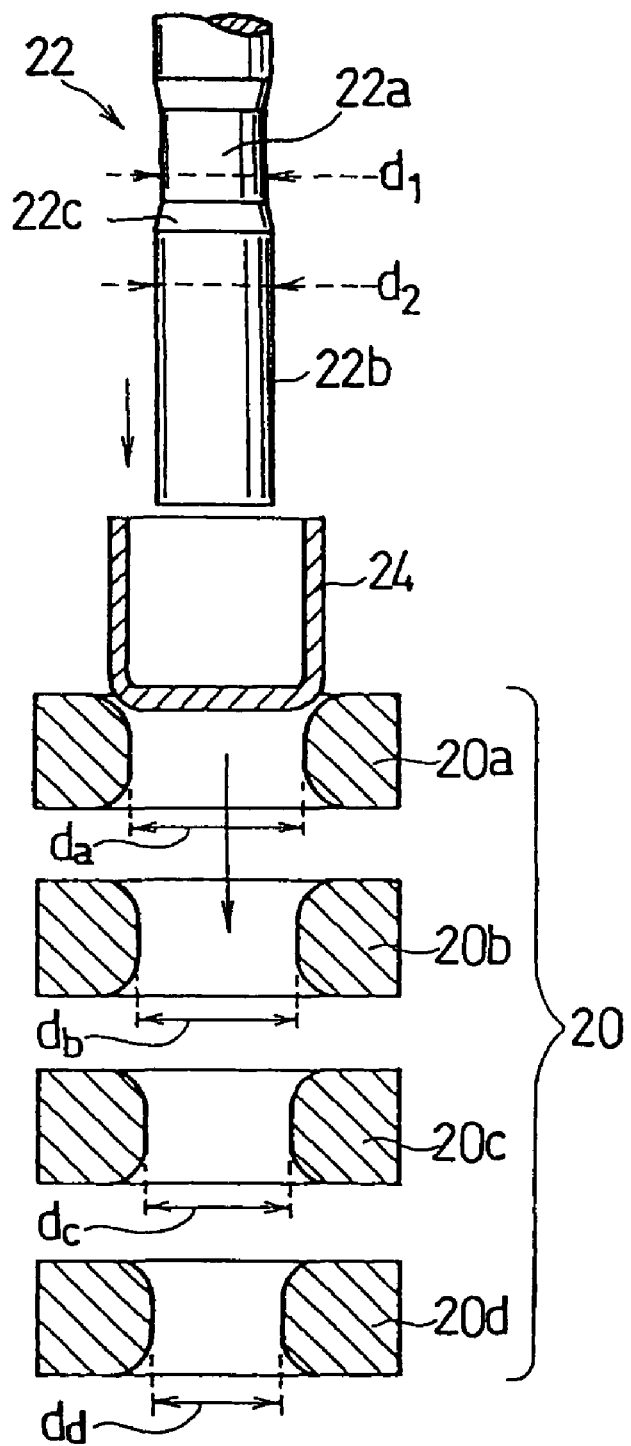
FIG. 2 is a diagram for showing a step of drawing and ironing for making a battery case.
Figure 3:
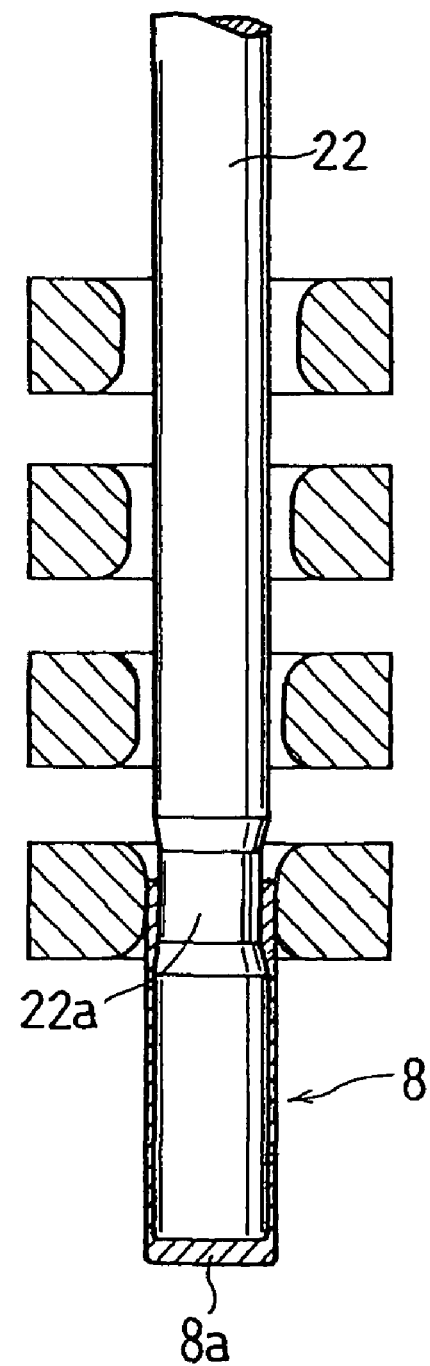
FIG. 3 is another diagram for showing another step of drawing and ironing for making the battery case.

According to the D&I process, the battery case 8 is produced by arranging a plurality of dies with different drawing/ironing diameters such that their ironing/ironing diameters gradually decrease, and continuously passing a cylinder with a bottom, made of a nickel plated steel plate, through the plurality of dies by pressing the cylinder with a molding punch, in order to draw and iron the cylinder. Referring now to FIGS. 2, 3 and 4, an exemplary method for producing the battery case 8 according to the D&I process is more specifically described. FIGS. 2 and 3 are diagrams for showing the steps of the D&I process, and FIG. 4 is a schematic cross-sectional view of the battery case 8 obtained.

As illustrated in FIGS. 2 and 3, a cylinder 24 with a bottom made of the above-mentioned nickel plated steel plate is processed by using molding dies 20 and a molding punch 22, to obtain the battery case 8 having the structure as illustrated in FIG. 4. The molding dies 20 are composed of one drawing die 20a and, for example, three ironing dies 20b to 20d that are arranged in series. As illustrated in FIGS. 2 and 3, by pressing the cylinder 24 with the molding punch 22, the cylinder 24 is continuously passed through the dies 20a to 20d, so that the cylinder 24 is drawn once and ironed three times (D&I process). The dies 20a to 20d are structured such that their internal diameters $d_a$ to $d_d$ gradually decrease.

The molding punch 22 has a can-forming part 22b, a rear end part 22a, and a tapered part 22c. The can-forming part 22b is designed to form a bottom 8a and a first cylindrical side wall 8b of the battery case 8 as illustrated in FIG. 4, while the rear end part 22a is designed to form a second cylindrical side wall 8c in FIG. 4. The diameter $d_1$ of the rear end part 22a and the diameter $d_2$ of the can-forming part 22b satisfy the relation: $d_1 < d_2$. Also, the cylinder 24 is prepared, for example, by feeding a nickel plated steel plate into a pressing machine, punching it into a predetermined shape and drawing the punched plate. The nickel plated steel plate may be a steel plate that is plated with nickel on one side or both sides thereof (i.e., the nickel plated steel plate may have a nickel plating layer on one side or both sides thereof).

An example of the steel plate used to prepare the nickel plated steel plate is a cold rolled steel composed mainly of iron, and this holds true of other production methods.

When the alkaline primary battery 100 is produced by using the battery case 8 thus obtained, the second cylindrical side wall 8c is bent inward upon sealing. Also, the bottom 8a has a smaller contact area with the positive electrode 2 than the second cylindrical side wall 8c. Therefore, the nickel plating layer at least on the inner surface of the first cylindrical side wall 8b of the battery case 8 (i.e., the inner side wall of the battery case 8 after sealing) is controlled such that at least one of the above-mentioned conditions (1) and (2) is satisfied.

In addition to controlling the nickel plating layer on the inner surface of the first cylindrical side wall 8b, the nickel plating layer on the inner surface of the second cylindrical side wall 8c and the inner surface of the bottom 8a can be controlled, such that at least one of the above-mentioned conditions (1) and (2) is satisfied.

That is, at least the inner side surface of the battery case 8 comprising the nickel plated steel plate is controlled such that the intensity ratio $I_{Fe/Ni}$ as determined by EPMA is from 0 to approximately 0.1 (condition (1)). In this range, particularly good leakage-resistance characteristics are obtained and degradation of low-rate discharge characteristics after storage can be sufficiently suppressed.

Also, the intensity ratio $I_{Fe/Ni}$ is preferably from approximately 0.002 to approximately 0.05. If it is 0.002 or more, the amount of nickel plating can be somewhat reduced and the cost can be reduced. If the ratio is 0.05 or less, leakage-resistance characteristics and low-rate discharge characteristics after storage are good and degradation of high-rate discharge characteristics after storage can be sufficiently suppressed.

Further, the intensity ratio $I_{Fe/Ni}$ is more preferably from approximately 0.002 to approximately 0.005. If it is 0.002 or more, the amount of nickel plating can be somewhat reduced and the cost can be reduced. If the ratio is 0.005 or less, leakage-resistance characteristics, low-rate discharge characteristics after storage and high-rate discharge characteristics after storage are good. Particularly, if the ratio is in this range, good conductivity can be obtained, for example, between the battery case 8 and the positive electrode 2 in a more reliable manner. Thus, there is no need to provide the inner surface of the battery case 8 with a conductive layer which will be described later, and the number of production steps and necessary components can be reduced. Therefore, this range is preferable.

Also, independently of or in combination with the condition (1), at least the inner side surface of the battery case 8 comprising the nickel plated steel plate is controlled such that the existence rate of the area with an intensity ratio $I_{Fe/Ni}$ of greater than 1.0 (i.e., $I_{Fe/Ni} > 1.0$) as determined by EPMA is 0 to approximately 1.0% (condition 2). In this range, particularly good leakage-resistance characteristics are obtained, and degradation of low-rate discharge characteristics after storage can be sufficiently suppressed.

Further, this existence rate is preferably approximately 0.01 to approximately 0.7%. If it is 0.01% or more, the amount of nickel plating can be somewhat reduced and the cost can be reduced. If the rate is 0.7% or less, particularly good leakage-resistance characteristics and low-rate discharge characteristics after storage are obtained, and degradation of high-rate discharge characteristics after storage can be sufficiently suppressed.

Furthermore, this existence rate is more preferably approximately 0.01 to approximately 0.3%. If it is 0.01% or more, the amount of nickel plating can be somewhat reduced and the cost can be reduced. If the rate is 0.3% or less, leakage-resistance characteristics, low-rate discharge characteristics after storage and high-rate discharge characteristics after storage are good. Particularly, if the rate is in this range, good conductivity can be obtained, for example, between the battery case 8 and the positive electrode 2 in a more reliable manner. Thus, there is no need to provide the inner surface of the battery case 8 with a conductive layer which will be described later, and the number of production steps and necessary components can be reduced. Therefore, this range is preferable.

The battery case 8 comprising a nickel plated steel plate with a nickel plating layer that satisfies at least one of the conditions (1) and (2) can be obtained by controlling, for example, the plating step and/or the annealing step in the production process of the nickel plated steel plate.

With respect to the plating step, for example, at least one condition selected from, for example, the composition of plating bath, the temperature of plating bath, the pH of plating bath, and current density is controlled. The plating bath may be, for example, one containing nickel sulfate, nickel chloride, and boric acid, and their concentrations may be controlled as appropriate.

Also, with respect to the annealing step that is performed after the plating layer is formed, for example, at least one condition selected from, for example, the composition of annealing atmosphere, annealing temperature, and annealing time is controlled. The annealing atmosphere may be, for example, a mixed gas atmosphere containing hydrogen gas and nitrogen gas (reducing atmosphere), and the concentration of the hydrogen gas and the flow rate of the mixed gas may be controlled.

The nickel plating layer at least on the inner surface of the first cylindrical side wall 8b of the battery case 8 (i.e., the inner side surface of the battery case 8 after sealing) preferably has a thickness of approximately 0.2 to approximately 1.0 μm. If the thickness is 0.2 μm or more, the nickel plating layer can cover the entire inner surface of at least the first cylindrical side wall 8b of the battery case 8 (i.e., the inner side surface of the battery case 8 after sealing), so that exposure of Fe can be minimized. Therefore, the thickness of 0.2 μm or more is preferable. If the thickness is 1.0 μm or less, an increase in the amount of plating is suppressed, which is preferable in terms of cost reduction.

The thickness of the nickel plating layer can be set in the above-mentioned range by controlling, for example, the plating step and/or the annealing step in the production process of the nickel plated steel plate and the drawing step and/or the ironing step in the construction process of the battery case 8. For example, the original thickness of the nickel plating layer of the nickel plated steel plate is reduced by the drawing step and/or ironing step, but the degree of reduction in thickness can be estimated in advance in order to obtain a nickel plated steel plate having a nickel plating layer of predetermined thickness.

In the construction process of the battery case 8, there may be a difference in the degree of drawing of the nickel plating layer between the first cylindrical side wall 8b and the second cylindrical side wall 8c in the direction of the arrow X in FIG. 4. Hence, the thickness of the nickel plating layer on the inner surface of the first cylindrical side wall 8b (i.e., the inner side surface of the battery case 8 after sealing) may have an error of −10 to +10%. The thickness of the nickel plating layer of the battery case 8 can be measured by means of fluorescent X rays.

The inner surface of the battery case 8 may have a conductive layer (not shown) such as a conductive carbon layer or a graphite coating layer. In this case, good conductivity can be obtained, for example, between the inner surface of the battery case 8 and the positive electrode 2 inside the battery case 8 in a more reliable manner, so that degradation of storage characteristics due to increased internal resistance can be suppressed in a more reliable manner. It should be noted, however, that the formation of such a conductive layer is not always necessary for achieving good storage characteristics relative to conventional ones when at least one of the above-mentioned conditions (1) and (2) is set preferably. Such a conductive layer is formed, for example, by spraying a dispersion of graphite in an aqueous solvent onto the inner surface of the battery case 8.

The positive electrode 2 comprises a plurality of hollow cylindrical positive electrodes. The positive electrodes comprise nickel oxyhydroxide, manganese dioxide, or mixtures of nickel oxyhydroxide and manganese dioxide as positive electrode active materials and may contain a conductive agent, a binder, an alkaline electrolyte, and various additives if necessary.

The nickel oxyhydroxide may be a conventional one and may be prepared by conventional methods. Also, the nickel oxyhydroxide may be, for example, a solid solution containing atoms such as manganese (Mn), cobalt (Co), and calcium (Ca). Further, the average nickel valence of the nickel oxyhydroxide is preferably approximately 3.05 or more, and more preferably 3.1 or more. When highly oxidized nickel oxyhydroxide is used, the battery capacity can be significantly heightened.

Highly oxidized nickel oxyhydroxide is readily prepared by chemically oxidizing a solid solution of nickel hydroxide containing manganese atoms. When manganese is dissolved in nickel hydroxide, which serves as a raw material for nickel oxyhydroxide, the oxidation reduction potential of the nickel hydroxide lowers, so that highly oxidized nickel oxyhydroxide is readily obtained. In order to maximize the density of nickel oxyhydroxide, the solid solution of nickel hydroxide containing manganese atoms preferably has a β-type crystal structure.

In the nickel hydroxide, which serves as the raw material for nickel oxyhydroxide, the content of manganese is, for example, approximately 1.0 to approximately 7.0 mol %, preferably approximately 2.0 to approximately 5.0 mol % of the total of nickel and manganese. If the manganese content is 1.0 mol % or more, such highly oxidized nickel oxyhydroxide can be obtained in a more reliable manner. If the manganese content is 7.0 mol % or less, the proportion of nickel in the nickel hydroxide does not relatively decrease, so that a satisfactory battery capacity can be obtained in a more reliable manner. When such nickel hydroxide is used as the raw material, the manganese content in the resultant nickel oxyhydroxide also becomes 1.0 to 7.0 mol % of the total of nickel and manganese contained therein.

It is preferred that the nickel oxyhydroxide have a cobalt oxide adhered to the particle surface thereof. Nickel oxyhydroxide having a cobalt oxide on the particle surface has an enhanced ability to collect current from the particles, so the discharge characteristics particularly with heavy load are further improved. The amount of the cobalt oxide is not more than 7.0% by weight, and preferably approximately 2.0 to approximately 5.0% by weight of the amount of the nickel oxyhydroxide. If the amount of the cobalt oxide is not more than 7.0% by weight of the nickel oxyhydroxide, the amount of the cobalt oxide is not excessive. Thus, for example, the dissolution of cobalt into the electrolyte can be suppressed and the battery reliability upon high-temperature storage can be ensured in a more reliable manner. In order to further improve the discharge characteristics with heavy load, it is preferred to use at least 2.0% by weight of a cobalt oxide relative to the amount of the nickel oxyhydroxide.

Highly oxidized nickel oxyhydroxide has a γ-type crystal structure, so it undergoes a large volume change when the battery is discharged. To suppress such volume change in the positive electrode 2, it is preferable to use expanded graphite as a conductive agent which will be described later.

The volume-based mean particle size of the nickel oxyhydroxide is preferably approximately 10 to approximately 30 μm. For example, when nickel hydroxide, serving as the starting substance, is synthesized by reactive crystallization, the particle size of nickel oxyhydroxide can be controlled by adjusting the pH inside the synthesis vessel, the residence time of the particles, reaction temperature, etc. Also, even if preparation of large particles is intended, the resultant mean particle size (volume basis) does not exceed 30 μm in many cases. In terms of heightening the density of the positive electrode mixture and improving the moldability, it is preferable to use nickel oxyhydroxide that is obtained from nickel hydroxide with a large particle size. In view of these points, the volume-based mean particle size of the nickel oxyhydroxide is preferably 10 to 30 μm.

The manganese dioxide may be a conventional one and may be prepared by conventional methods. Particularly electrolytic manganese dioxide has high purity and therefore can be used preferably. Electrolytic manganese dioxide can be prepared, for example, by electrolyzing strongly acidic manganese sulfate and removing the sulfuric acid components by applying an alkali neutralization treatment using sodium hydroxide (NaOH). If this neutralization treatment is insufficient, the resultant electrolytic manganese dioxide contains residual sulfuric acid components, and this acid may locally corrode the inner surface of the battery case 8 when a battery is fabricated. Therefore, it is preferable to fully perform the neutralization treatment.

In the neutralization treatment, part of the sodium hydroxide remains on the surfaces or in the pores of the resultant electrolytic manganese dioxide particles. Thus, the degree of the neutralization treatment can be judged from the amount of residual Na. The residual Na contained in the manganese dioxide is preferably approximately 2,000 to approximately 7,000 ppm. If it is 2,000 ppm or more, the amount of the residual sulfuric acid components is small, which indicates that neutralization has been appropriately accomplished. Hence, the local corrosion of the inner surface of the battery case 8 by the acid can be suppressed in a more reliable manner. Also, if the residual Na is 7,000 ppm or less, degradation of the electrolytic manganese dioxide in single electrode potential and activity is suppressed and appropriate discharge performance can be obtained.

Also, the residual Na contained in the manganese dioxide is more preferably approximately 2,000 to approximately 5,000 ppm. If it is 2,000 ppm or more, the amount of the residual sulfuric acid components is small, which indicates that neutralization has been appropriately accomplished. Hence, the local corrosion of the inner surface of the battery case 8 by the acid can be suppressed in a more reliable manner. Also, if the residual Na is 5,000 ppm or less, degradation of the electrolytic manganese dioxide in single electrode potential and activity is suppressed in a more reliable manner and appropriate discharge performance can be obtained in a more reliable manner.

Also, the volume-based mean particle size of the manganese dioxide is preferably 30 to 50 μm. The particle size of the manganese dioxide can be controlled, for example, by adjusting the conditions under which manganese dioxide separated from the electrode in the electro deposition step is crushed. Generally, when the particle size is too small, discharge capacity lowers, and when the particle size is too large, high-load discharge characteristics degrade. Also, a large particle size is more suitable for forming positive electrode mixture pellets. In consideration of these points, the volume-based mean particle size of the manganese dioxide is preferably approximately 30 to approximately 50 μm.

The conductive agent may be a conventional one, and examples include graphite, carbon black, and carbon fiber. The use of graphite is preferable because graphite has good moldability in forming positive electrode mixture pellets. Among them, expanded graphite is preferable since it has good compressibility (buffer action) and good ability to relax stress in the positive electrode mixture, in addition to having high electronic conductivity equivalent to that of common graphite such as natural graphite. Expanded graphite is usually prepared by applying a heat-treatment to well-crystallized graphite with sulfuric acid, nitric acid or the like to expand the graphite or graphite layers.

The binder may be a conventional one, and an example is polyethylene powder. Also, with respect to various additives, conventional additives such as a surfactant may be used. The alkaline electrolyte which may be used will be described later.

The positive electrode 2 comprising the above-mentioned constituent components is produced as follows. First, a positive electrode active material selected from the group consisting of nickel oxyhydroxide, manganese dioxide, and a mixture of nickel oxyhydroxide and manganese dioxide is mixed together with a conductive agent such as graphite, a small amount of an alkaline electrolyte, and, if necessary, a binder and an additive and stirred. This mixture of particles is molded under pressure into hollow cylinders, to obtain positive electrode mixture pellets. A plurality of positive electrode mixture pellets can be used as the positive electrode 2.

The negative electrode 4 is a gelled negative electrode and is prepared by mixing a gelling agent, a zinc component serving as a negative electrode active material, and an alkaline electrolyte to form a gel. The gelling agent may be, for example, sodium polyacrylate or any other suitable gelling agent, and the zinc component serving as the negative electrode active material may be zinc or a zinc alloy. The alkaline electrolyte which may be used will be described later.

Also, the negative electrode active material may be a metal that exhibits a low potential in an alkaline aqueous solution and is capable of discharging and stable. The negative electrode 4 may comprise such a metal to which another metal or an organic or inorganic additive such as a surfactant is added to prevent corrosion and enhance stability.

The separator 6 may be a conventional one and may be made of, for example, non-woven fabric. Exemplary fibers constituting the non-woven fabric include polyvinyl alcohol fiber, cellulose fiber such as rayon, polyolefin fiber, and polyphenyl sulfone fiber. It is also possible to use two or more kinds of these fibers to form non-woven fabric.

The alkaline electrolyte may be a conventional one and is preferably an alkaline aqueous solution composed mainly of potassium hydroxide. Sodium hydroxide, lithium hydroxide, calcium hydroxide, or the like may also be used.

Particularly, an aqueous solution containing not less than approximately 32% by weight of potassium hydroxide is preferably used. As described above, manganese dioxide (particularly electrolytic manganese dioxide) is an acid substance. Thus, if the inner surface of the battery case 8 has areas where Fe is exposed, Fe may be dissolved by manganese dioxide. However, if the concentration of the potassium hydroxide aqueous solution is 32% by weight or more, the manganese dioxide can be neutralized in a more reliable manner and the dissolution of Fe can be suppressed in a more reliable manner.

Next, a method for fabricating the alkaline primary battery 100 comprising the above-mentioned constituent components is described. First, a plurality of the above-mentioned hollow cylindrical positive electrode mixture pellets, serving as the positive electrode 2, are inserted into the battery case 8 serving as the positive electrode terminal. The pellets are repressed inside the battery case 8 such that they closely adhere to the inner surface of the battery case 8.

Subsequently, the separator 6 and an insulating cap 6a are fitted to the inner surface of the hollow portion of the positive electrode 2 and the inner surface of the bottom 8a of the battery case 8. Thereafter, an alkaline electrolyte is injected to wet the separator 6 and the positive electrode 2. The insulating cap 6a may be composed of the same material as that of the separator 6.

After the injection of the alkaline electrolyte, the gelled negative electrode 4 is filled into the hollow portion inside the separator 6. Subsequently, a negative electrode current collector 4a is inserted into the middle of the gelled negative electrode 4. The negative electrode current collector 4a may be, for example, a brass rod. The negative electrode current collector 4a is integrally combined with a resin sealing member 10 and a bottom plate 12 serving as the negative electrode terminal.

Thereafter, the opening of the battery case 8 (lower side in FIG. 1) is crimped onto the circumference of the bottom plate 12 with the edge of the sealing member 10 interposed therebetween, so that the opening of the battery case 8 is sealed. Lastly, the outer surface of the battery case 8 is covered with an exterior label 14, to obtain the alkaline primary battery 100.

Although the invention has been described in terms of preferable embodiments, it is to be understood that the invention is not limited to only the above-described preferable embodiments. Therefore, various alterations and modifications are possible. For example, in producing the nickel plated steel plate, the annealing step may be performed after the battery case is constructed. Also, the plating step and the annealing step may be performed after the battery case is constructed using the steel plate.

Examples of the present invention are hereinafter described, but the present invention is not limited to only these Examples.

Example 1

Manganese dioxide powder with a mean particle size of approximately 35 µm (HHTF available from Tosoh Corporation or NTA grade available from Delta Electrical Industries Ltd.), nickel oxyhydroxide and graphite powder were mixed in a weight ratio of 50:40:10, to form a first mixture. The first mixture and 40% by weight of a potassium hydroxide aqueous solution were mixed in a weight ratio of 100:1 and sufficiently stirred, to form a second mixture. The second mixture was compression molded into flakes, which were then crushed into granules. The granules were classified with a sieve, to obtain granules of 10 to 100 mesh size. These granules were molded under pressure into hollow cylinders, to obtain positive electrode mixture pellets.

Nickel oxyhydroxide was prepared by chemically oxidizing nickel hydroxide powder available from Tanaka Chemical Corporation as follows. Nickel hydroxide powder with a mean particle size of 15 µm was put in a sodium hydroxide aqueous solution, which was then mixed with a sufficient amount (corresponding to 2 equivalents) of a sodium hypochlorite aqueous solution with an effective chlorine concentration of 12% by weight. The resultant solution was stirred for 3 hours to prepare nickel oxyhydroxide powder. The powder was then fully washed with water and dried at 60° C. in a vacuum. This powder was used in this example.

Also, sodium polyacrylate serving as a gelling agent, 40% by weight of a potassium hydroxide aqueous solution as an alkaline electrolyte, and a zinc powder as a negative electrode active material were mixed together in a weight ratio of 1:33:66, to form a gelled negative electrode. The zinc powder used was ABI35RAD (zinc-aluminum-bismuth-indium alloy) available from Mitsui Mining And Smelting Company, Limited, and the gelling agent was a 1:2 mixture of PW-150 available from Nihon Junyaku Co., Ltd. and DK-500B available from Sanyo Chemical Industries Ltd.

Next, a nickel plated steel plate was prepared. This nickel plated steel plate, composed of low-carbon steel, had a 1.5-µm thick nickel plating layer on the surface which would become the inner surface of a cylindrical battery case with a bottom and a 2.5-µm thick nickel plating layer on the surface which would become the outer surface of the battery case.

This nickel plated steel plate was prepared as follows. First, a 0.4-mm-thick cold rolled steel plate in the form of a hoop was prepared. The steel plate was composed mainly of Fe and contained 0.028% by weight of C, 0.01% by weight of Si, 0.18% by weight of Mn, 0.004% by weight of S, 0.013% by weight of P, and 0.043% by weight of Al, as well as impurities. The steel plate was electrolytically plated with nickel under the conditions as shown in Table 1.

TABLE 1

| | Condition | |
|---|---|---|
| Plating bath composition | Nickel sulfate | 250 g/L |
| | Nickel chloride | 45 g/L |
| | Boric acid | 30 g/L |
| Plating bath temperature | 50° C. | |
| Current density | 0.1 A/cm$^2$ | |
| pH | 4.3 | |

The nickel plated steel plate was introduced into a continuous annealing furnace, where it was annealed in a nitrogen flow containing approximately 1% of hydrogen gas (i.e., reducing atmosphere) at 800° C. for 1 minute so that Fe was diffused in the nickel plating layers. Using the resultant nickel plated steel plate, a battery case with the structure as illustrated in FIG. 4 was constructed by the D&I process, which has been described in connection with the foregoing embodiments. The thickness of the nickel plating layer on the inner side surface of the battery case is shown in Table 2.

Also, with respect to the inner side surface of the battery case, the intensity ratio $I_{Fe/Ni}$ as determined by EPMA (condition (1)) and the existence rate of the area with an intensity ratio $I_{Fe/Ni}$ of greater than 1.0 (condition (2)) were obtained. More specifically, a sample of approximately 1 cm×approximately 1 cm was cut out of the inner side surface of the battery case. The sample was then set in an electron probe microanalyzer and measured under the following conditions.

Analysis equipment: JEOL JXA-8900

Acceleration voltage: 15 kV

Amount of electron beam (probe current): 0.05 µA

Measurement time per point: 30 ms

Measurement range per point (1 pixel): 2 µm

Irradiation range per point (probe diameter): 1 µm or less

Specifically, a characteristic X-ray of Fe and a characteristic X-ray of Ni were measured at a given point (an area of 2 µm×2 µm), and based on the counts of the characteristic X-rays, the intensity ratio $I_{Fe/Ni}$ at the point was calculated. In measuring one sample, such measurement was conducted, for example, in an area of 510 µm×680 µm, at 86700 points (255 points×340 points=86700 points). The average value of the intensity ratios $I_{Fe/Ni}$ at all the points was calculated, and this average value was used as the intensity ratio $I_{Fe/Ni}$. Also, the intensity ratios $I_{Fe/Ni}$ thus obtained were statistically analyzed to obtain frequency distribution, and the ratio of the points with an intensity ratio $I_{Fe/Ni}$ of greater than 1.0 to all the points was obtained. This ratio was used as the existence rate. The intensity ratio $I_{Fe/Ni}$ and the existence rate are shown in Table 2.

Using the positive electrode, negative electrode and battery case thus obtained, an alkaline primary battery with the structure as illustrated in FIG. 1 was assembled.

First, a conductive layer of a carbonaceous material was formed on the inner surface of the battery case 8. Next, a plurality of the positive electrode mixture pellets were inserted in the battery case as the positive electrode, and they were repressed inside the battery case so that it closely adhered to the inner surface of the battery case. A cylindrical separator with a bottom, made of non-woven fabric of polyvinyl alcohol fiber and rayon fiber, and a disc-like insulating cap made of the same non-woven fabric were fitted to the inner surface of the hollow of the positive electrode and the inner surface of the bottom of the battery case. Thereafter, a 40% by weight potassium hydroxide aqueous solution was injected therein.

The conductive layer was formed by spraying a dispersion of graphite mixed with liquid component onto the inner surface of the battery case 8. The liquid component was removed by drying. The liquid component may be an organic or aqueous solvent.

Examples of the dispersions are LB1000 (Timcal Ltd.), Eccocoate 257 (W. R. Grace & Co.); Electrodag 109 (Acheson Industries, Inc.); Electrodag 112, EB00, ED109B and EB020A (Acheson Industries, Inc.); and #27-5 and #523-3 (Nippon Graphite Industries, ltd.). Suitable dispersions are #523-3 or EB020A because these are dispersions of graphite mixed with water and environmentally friendly products. Conditions (1) and (2) can be satisfied when using such an aqueous solvent type dispersion and there is no concern of forming rust on the inner surface of the battery case. Accordingly, example 1 used #523-3 (Nippon Graphite Industries, ltd.) as the dispersion.

After the injection of the alkaline electrolyte, the gelled negative electrode was charged into the hollow portion inside the separator. Subsequently, a brass negative electrode current collector integrally combined with a sealing member and a bottom plate was inserted into the middle of the gelled negative electrode. Lastly, the opening of the battery case was crimped onto the circumference of the bottom plate with the edge of the sealing member interposed therebetween, to seal the opening of the battery case. The outer surface of the battery case was covered with an exterior label, to produce the alkaline primary battery of this Example.

Example 2

This example used a nickel plated steel plate having a 1.0-μm thick nickel plating layer on the surface which would become the inner surface of a battery case and a 2.5μ-m thick nickel plating layer on the surface which would become the outer surface of the battery case. Using this nickel plated steel plate, an alkaline primary battery was produced in the same manner as in Example 1 except that the thickness of the nickel plating layer on the inner side surface of the battery case, the intensity ratio $I_{Fe/Ni}$, and the existence rate were changed as shown in Table 2.

Example 3

This example used a nickel plated steel plate having a 0.5-μm thick nickel plating layer on the surface which would become the inner surface of a battery case and a 2.5-μm thick nickel plating layer on the surface which would become the outer surface of the battery case. Using this nickel plated steel plate, an alkaline primary battery was produced in the same manner as in Example 1 except that the thickness of the nickel plating layer on the inner side surface of the battery case, the intensity ratio $I_{Fe/Ni}$, and the existence rate were changed as shown in Table 2.

Comparative Example 1

An alkaline primary battery was produced in the same manner as in Example 1, except that the annealing step was not performed and that the thickness of the nickel plating layer on the inner side surface of the battery case, the intensity ratio $I_{Fe/Ni}$, and the existence rate were changed as shown in Table 2.

Comparative Example 2

An alkaline primary battery was produced in the same manner as in Example 1, except that, after a nickel plated steel plate was processed into a battery case, additional nickel plating was applied to the inner surface of the battery case, that the thickness of the nickel plating layer on the inner side surface of the battery case was changed to 1.5 μm, and that the intensity ratio $I_{Fe/Ni}$ and the existence rate were changed to 0. However, due to the additional plating step, the production of this alkaline primary battery required a long time, and the too thick nickel plating layer tended to separate, which resulted in high costs.

[Evaluation Test]
(a) Leakage-Resistance Characteristics

Of each of Examples 1 to 3 and Comparative Examples 1 and 2, 100 alkaline primary batteries were prepared. These 100 alkaline primary batteries were stored in an environment at 60° C. for 4 weeks, and the number of leaked batteries was counted. The results are shown in Table 2.

(b) Amount of Gas Produced

Of each of Examples 1 to 3 and Comparative Examples 1 and 2, 10 alkaline primary batteries were prepared. These 10 alkaline primary batteries were stored in an environment at 60° C. for 4 weeks. Thereafter, the batteries were disassembled in water and the volume of gas produced was measured. The results are shown in Table 2.

(c) Storage Characteristics
(i) Low-Rate Discharge Characteristics

Of each of Examples 1 to 3 and Comparative Examples 1 and 2, 10 alkaline primary batteries were prepared. These 10 alkaline primary batteries were stored in an environment at 60° C. for 4 weeks. Thereafter, the batteries were continuously discharged at a constant current of 100 mA, and the time it took for the voltage to drop to 0.9 V was measured. The results are shown in Table 2.

(ii) High-Rate Discharge Characteristics

Of each of Examples 1 to 3 and Comparative Examples 1 and 2, 10 alkaline primary batteries were prepared. These 10 alkaline primary batteries were stored in an environment at 60° C. for 4 weeks. Thereafter, the batteries were continuously discharged at a constant current of 1500 mA, and the time it took for the voltage to drop to 0.9 V was measured. The results are shown in Table 2.

TABLE 2

| | Ni-plated steel plate | | Inner side face of battery case | | | | | Storage characteristics | |
|---|---|---|---|---|---|---|---|---|---|
| | Thickness of Ni plating layer (Inner surface side) (μm) | Annealing | Intensity ratio $I_{Fe/Ni}$ | Existence rate (%) | Thickness of Ni plating layer (μm) | Leakage resistance characteristics (Count No.) | Amount of gas produced (cc) | Low-rate discharge characteristics (min) | High-rate discharge characteristics (min) |
| Example 1 | 1.5 | Annealed | 0.005 | 0.01 | 0.8 | Good (0/100) | 0.51 (100) | Good 1174 (100) | Good 22.1 (100) |
| Example 2 | 1.0 | Annealed | 0.01 | 0.4 | 0.6 | Good (0/100) | 0.53 (104) | Good 1170 (100) | Acceptable 21.0 (95) |
| Example 3 | 0.5 | Annealed | 0.07 | 0.7 | 0.2 | Good (0/100) | Acceptable 0.58 (114) | Acceptable 1115 (95) | Poor 19.9 (90) |
| Comparative example 1 | 1.5 | Not annealed | 0.5 | 3.0 | 1.0 | Poor (30/100) | — | Poor 998 (85) | Poor 11.1 (50) |
| Comparative example 2 | 1.5 | Not annealed | 0 | 0 | 1.5 | — | — | — | — |

Table 2 shows that the alkaline primary batteries in an aspect of the invention are excellent in leakage-resistance and storage characteristics. As described above, the electrochemical device in an aspect of the invention that is excellent in leakage-resistance and storage characteristics is applicable to not only alkaline primary batteries but also various electrochemical devices such as lithium primary batteries, and can be preferably used, for example, as the power source for electronic devices such as communications devices and portable devices.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as falling within the true spirit and scope of the invention.

The invention claimed is:

1. An electrochemical device comprising:
   a positive electrode comprising a positive electrode active material selected from the group consisting of nickel oxyhydroxide, manganese dioxide, and a mixture of nickel oxyhydroxide and manganese dioxide;
   a negative electrode comprising a zinc component as a negative electrode active material;
   a separator interposed between said positive electrode and said negative electrode;
   an alkaline electrolyte; and
   a battery case, formed into a battery can shape, for housing said positive electrode, said negative electrode, said separator, and said alkaline electrolyte, wherein:
   said battery case includes a nickel plated steel plate having a nickel plating layer at least on an inner side surface of the battery case, and
   at least the inner side surface of the battery case has a surface structure satisfying that an intensity ratio of Fe to Ni ($I_{Fe/Ni}$) as determined by electron probe microanalysis is from approximately 0.002 to approximately 0.005.

2. The electrochemical device in accordance with claim 1, wherein said inner side surface of said battery case further has a conductive layer.

3. The electrochemical device in accordance with claim 1, wherein:
   said positive electrode active material includes manganese dioxide, and
   said manganese dioxide in said positive electrode contains approximately 2000 to approximately 7000 ppm of residual Na.

4. The electrochemical device in accordance with claim 1, wherein:
   said positive electrode active material includes manganese dioxide, and
   said manganese dioxide in said positive electrode contains approximately 2000 to approximately 5000 ppm of residual Na.

5. The electrochemical device in accordance with claim 1, wherein said alkaline electrolyte is an aqueous solution containing more than or equal to approximately 32% by weight of potassium hydroxide.

6. The electrochemical device in accordance with claim 1, wherein said nickel plating layer has a thickness of approximately 0.2 to approximately 1.0 μm.

7. An electrochemical device comprising:
   a positive electrode comprising a positive electrode active material selected from the group consisting of nickel oxyhydroxide, manganese dioxide, and mixtures of nickel oxyhydroxide and manganese dioxide;
   a negative electrode comprising a zinc component as a negative electrode active material;
   a separator interposed between said positive electrode and said negative electrode;
   an alkaline electrolyte; and
   a battery case, formed into a battery can shape, for housing said positive electrode, said negative electrode, said separator, and said alkaline electrolyte, wherein:
   said battery case includes a nickel plated steel plate having a nickel plating layer at least on an inner side surface of the battery case, and
   at least the inner side surface of the battery case has a surface structure satisfying that a ratio of an area with an intensity ratio of Fe to Ni ($I_{Fe/Ni}$) of greater than 1.0 as determined by electron probe microanalysis to a whole area is approximately 1.0% or less.

8. The electrochemical device in accordance with claim 7, wherein said inner side surface of said battery case further has a conductive layer.

9. The electrochemical device in accordance with claim 7, wherein said ratio of an area with an intensity ratio of Fe to Ni ($I_{Fe/Ni}$) of greater than 1.0 is approximately 0.01 to approximately 0.7%.

10. The electrochemical device in accordance with claim 7, wherein said ratio of an area with an intensity ratio of Fe to Ni ($I_{Fe/Ni}$) of greater than 1.0 is approximately 0.01 to approximately 0.3%.

11. The electrochemical device in accordance with claim 7, wherein:
said positive electrode active material includes manganese dioxide, and
said manganese dioxide in said positive electrode contains approximately 2000 to approximately 7000 ppm of residual Na.

12. The electrochemical device in accordance with claim 7, wherein:
said positive electrode active material includes manganese dioxide, and
said manganese dioxide in said positive electrode contains approximately 2000 to approximately 5000 ppm of residual Na.

13. The electrochemical device in accordance with claim 7, wherein said alkaline electrolyte is an aqueous solution containing more than or equal to approximately 32% by weight of potassium hydroxide.

14. The electrochemical device in accordance with claim 7, wherein said nickel plating layer has a thickness of approximately 0.2 to approximately 1.0 μm.

15. An electrochemical device comprising:
a positive electrode comprising a positive electrode active material selected from the group consisting of nickel oxyhydroxide, manganese dioxide, and mixtures of nickel oxyhydroxide and manganese dioxide;
a negative electrode comprising a zinc component as a negative electrode active material; a separator interposed between said positive electrode and said negative electrode;
an alkaline electrolyte; and
a battery case, formed into a battery can shape, for housing said positive electrode, said negative electrode, said separator, and said alkaline electrolyte, wherein:
said battery case includes a nickel plated steel plate having a nickel plating layer at least on an inner side surface of the battery case, and
at least the inner side surface of the battery case has a surface structure satisfying that an intensity ratio of Fe to Ni ($I_{Fe/Ni}$) as determined by electron probe microanalysis is from approximately 0.002 to approximately 0.005 and a ratio of an area with an intensity ratio of Fe to Ni ($I_{Fe/Ni}$) of greater than 1.0 as determined by electron probe microanalysis to a whole area is approximately 1.0% or less.

16. The electrochemical device in accordance with claim 15, wherein said inner side surface of said battery case further has a conductive layer.

17. The electrochemical device in accordance with claim 15, wherein said ratio of an area with an intensity ratio of Fe to Ni ($I_{Fe/Ni}$) of greater than 1.0 is approximately 0.01 to approximately 0.7%.

18. The electrochemical device in accordance with claim 15, wherein said ratio of an area with an intensity ratio of Fe to Ni ($I_{Fe/Ni}$) of greater than 1.0 is approximately 0.01 to approximately 0.3%.

19. The electrochemical device in accordance with claim 15, wherein:
said positive electrode active material includes manganese dioxide, and
said manganese dioxide in said positive electrode contains approximately 2000 to approximately 7000 ppm of residual Na.

20. The electrochemical device in accordance with claim 15, wherein:
said positive electrode active material includes manganese dioxide, and
said manganese dioxide in said positive electrode contains approximately 2000 to approximately 5000 ppm of residual Na.

21. The electrochemical device in accordance with claim 15, wherein said alkaline electrolyte is an aqueous solution containing more than or equal to approximately 32% by weight of potassium hydroxide.

22. The electrochemical device in accordance with claim 15, wherein said nickel plating layer has a thickness of approximately 0.2 to approximately 1.0 μm.

* * * * *